(12) United States Patent
Werner

(10) Patent No.: US 9,097,283 B2
(45) Date of Patent: Aug. 4, 2015

(54) SNAP-ON CAGE BRIDGE FOR ROLLING ELEMENT BEARINGS

(75) Inventor: Brian J. Werner, Carrollton, OH (US)

(73) Assignee: The Timken Company, North Canton, OH (US)

( * ) Notice: Subject to any disclaimer, the term of this patent is extended or adjusted under 35 U.S.C. 154(b) by 0 days.

(21) Appl. No.: 13/394,227

(22) PCT Filed: Sep. 10, 2010

(86) PCT No.: PCT/US2010/048373
§ 371 (c)(1),
(2), (4) Date: Mar. 5, 2012

(87) PCT Pub. No.: WO2011/031931
PCT Pub. Date: Mar. 17, 2011

(65) Prior Publication Data
US 2012/0167391 A1    Jul. 5, 2012

Related U.S. Application Data

(60) Provisional application No. 61/241,549, filed on Sep. 11, 2009.

(51) Int. Cl.
*F16C 33/51* (2006.01)
*F16C 33/46* (2006.01)
*F16C 33/50* (2006.01)

(52) U.S. Cl.
CPC .............. *F16C 33/4611* (2013.01); *F16C 33/50* (2013.01); *F16C 2300/14* (2013.01); *Y10T 29/4968* (2015.01)

(58) Field of Classification Search
CPC ...... F16C 33/4611; F16C 33/50; F16C 33/54; F16C 33/502; F16C 2300/14; F16C 33/4664; F16C 33/506; Y10T 29/4968

USPC .......................................... 384/523, 572, 573
See application file for complete search history.

(56) References Cited

U.S. PATENT DOCUMENTS 1,340,310 A    5/1920  Wolff
1,444,326 A    2/1923  Buckwalter
(Continued)

FOREIGN PATENT DOCUMENTS

DE    1207719        12/1965
DE    8110058 U1     9/1981
(Continued)

OTHER PUBLICATIONS

Notification of Transmittal of the International Search Report and the Written Opinion of the International Searching Authority, or the Declaration; International Application No. PCT/US2010/048373 filed Sep. 10, 2010.

(Continued)

*Primary Examiner* — Alan B Waits
(74) *Attorney, Agent, or Firm* — Michael Best & Friedrich LLP

(57) ABSTRACT

A light weight bearing cage assembly (100) consisting of a plurality of snap-on bridge elements (104) coupled between first and second cage support rings (102A, 102B) conforming to the surfaces of adjacent rolling elements (10). The snap-on bridge elements maintain rolling element (10) in separation, provide rolling element retention within the bearing assembly, and function as a lubrication reservoir between the rolling elements for grease lubricated bearings. Each snap-on bridge element may be individually removed and replaced by snap-on engagement with the first and second cage support rings. Optional locking clips or rings (300, 302) fitted over each snap fitting end of the bridge elements optionally provides additional security against accidental uncoupling of the bridge elements from the first and second cage rings.

14 Claims, 9 Drawing Sheets

(56) References Cited

U.S. PATENT DOCUMENTS

| | | | |
|---|---|---|---|
| 1,693,550 A | 11/1928 | Delaval-Crow | |
| 1,699,713 A | 1/1929 | Plummer, Jr. | |
| 2,042,417 A | 5/1936 | Wise | |
| 2,677,449 A | 5/1954 | Wavak | |
| 2,946,633 A * | 7/1960 | Gothberg | 384/576 |
| 3,124,396 A | 3/1964 | Barager | |
| 3,230,605 A | 1/1966 | Schaeffler | |
| 3,400,991 A | 9/1968 | Haller | |
| 3,626,565 A | 12/1971 | Koch | |
| 4,054,340 A | 10/1977 | Broshkevitch | |
| 4,239,304 A | 12/1980 | Wakunami | |
| 4,244,630 A | 1/1981 | Tischer | |
| 4,387,939 A | 6/1983 | Walter | |
| 4,500,144 A | 2/1985 | de Campos | |
| 4,722,619 A | 2/1988 | Reiser | |
| 4,825,964 A | 5/1989 | Rives | |
| 4,844,628 A | 7/1989 | Knappe | |
| 4,865,473 A | 9/1989 | De Vito | |
| 4,961,651 A | 10/1990 | Rabe | |
| 5,009,525 A | 4/1991 | Brockmuller | |
| 5,033,876 A | 7/1991 | Kraus | |
| 5,082,375 A | 1/1992 | Hillmann | |
| 5,116,146 A | 5/1992 | Stenert | |
| 5,230,571 A | 7/1993 | Estkowski | |
| 5,284,285 A | 2/1994 | Ferguson | |
| 5,335,416 A | 8/1994 | Alling | |
| 5,474,389 A | 12/1995 | Garcia | |
| 5,660,485 A | 8/1997 | Padhajecki et al. | |
| 6,179,474 B1 | 1/2001 | Podhajecki | |
| 6,261,005 B1 | 7/2001 | Winkler | |
| 6,394,659 B1 | 5/2002 | Earthrowl | |
| 6,709,163 B2 | 3/2004 | van der Knokke | |
| 6,883,968 B2 | 4/2005 | Fugel | |
| 6,912,878 B2 | 7/2005 | Belden, Jr. | |
| 6,988,833 B1 | 1/2006 | Docimo | |
| 7,353,926 B2 | 4/2008 | Ikeda | |
| 7,507,028 B2 | 3/2009 | Markle | |
| 2002/0023817 A1 | 2/2002 | Schwarzbich | |
| 2005/0196089 A1* | 9/2005 | Kono et al. | 384/572 |
| 2010/0111460 A1* | 5/2010 | Albrecht et al. | 384/572 |

FOREIGN PATENT DOCUMENTS

| | | | |
|---|---|---|---|
| DE | 4211400 C2 | | 12/1999 |
| DE | 102006045436 A1 | | 3/2008 |
| DE | 102007002359 A1 | * | 7/2008 |
| DE | 102007002360 A1 | | 7/2008 |
| EP | 0016880 B1 | | 5/1982 |
| EP | 0750125 B1 | | 5/2000 |
| EP | 1033504 A2 | | 9/2000 |
| EP | 1408248 A3 | | 4/2006 |
| GB | 908826 A | | 10/1962 |
| GB | 1563935 | | 4/1980 |
| GB | 2115889 A | | 9/1983 |
| JP | H09242759 | | 9/1997 |
| JP | 2002227849 A | | 8/2002 |

OTHER PUBLICATIONS

Office action for European Application No. EP 10 755 279.6, dated Jul. 1, 2014 (8 pages).

* cited by examiner

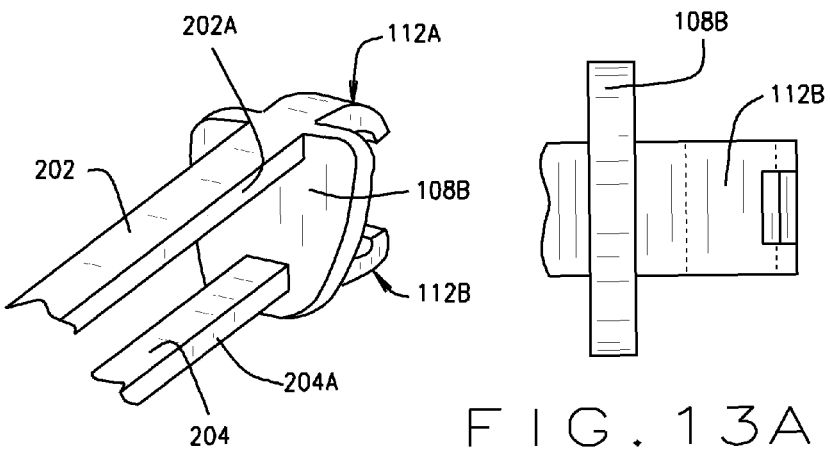
FIG. 12
FIG. 13A
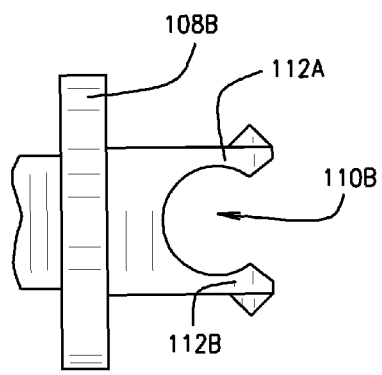
FIG. 13B
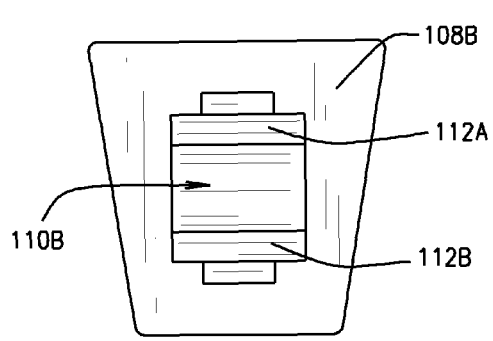
FIG. 13C

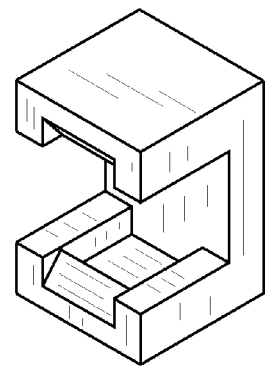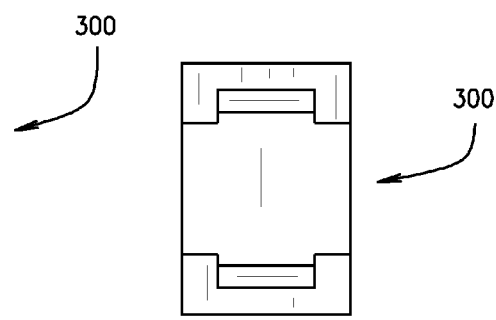
FIG.14A  FIG.14B
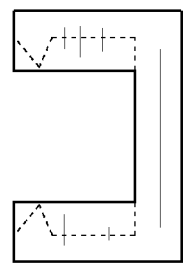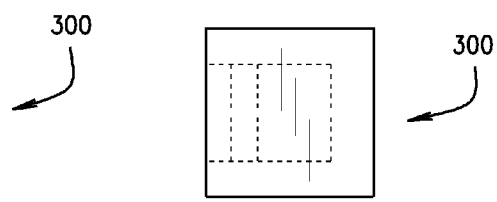
FIG.14C  FIG.14D
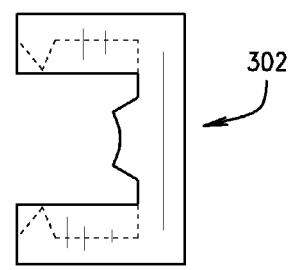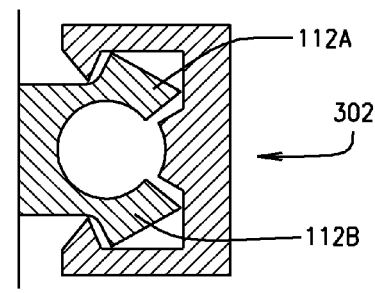
FIG.15A  FIG.15B

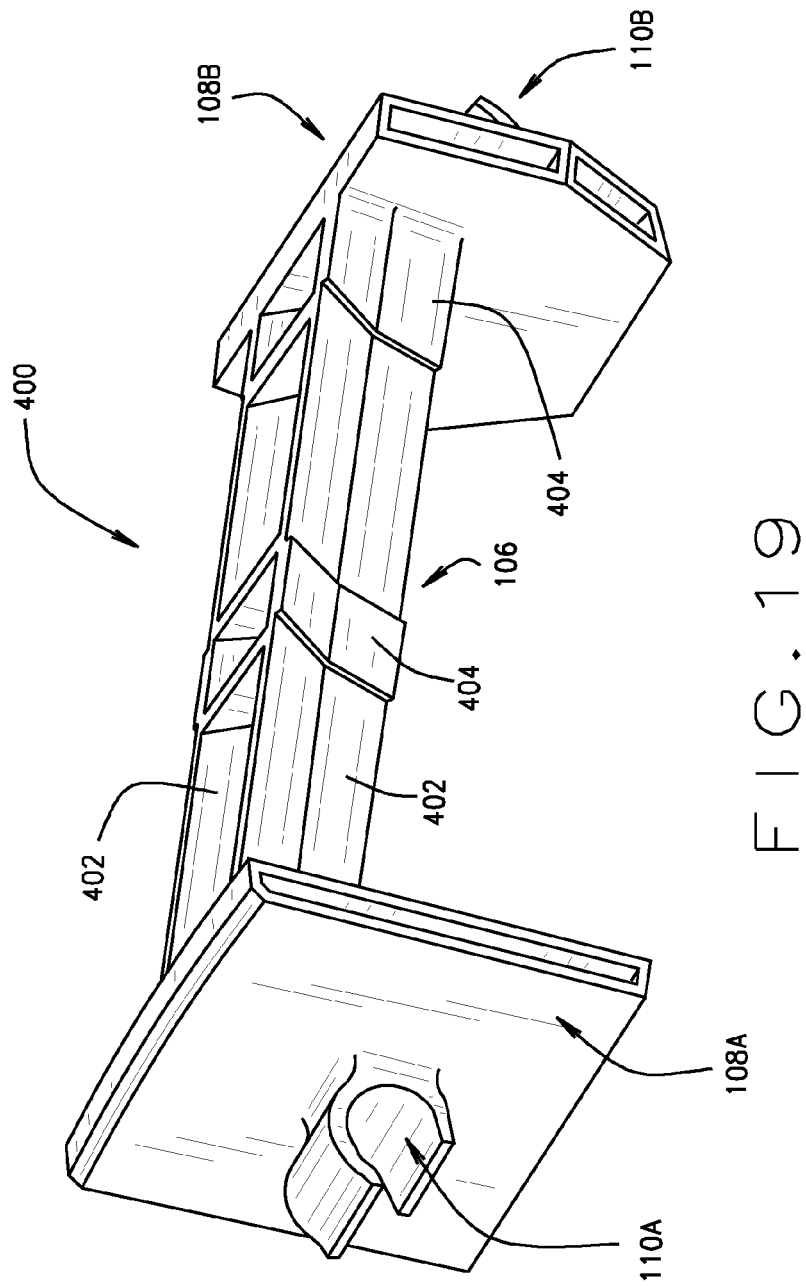

SNAP-ON CAGE BRIDGE FOR ROLLING ELEMENT BEARINGS

CROSS-REFERENCE TO RELATED APPLICATIONS

The present application is the United States National Stage under 35 U.S.C. §371 of International Application Serial No. PCT/US2010/048373, having an international Filing Date of Sep. 10, 2010. International Application Serial No. PCT/US2010/048373 is related to, and claims priority from, U.S. Provisional Patent Application Ser. No. 61/241,549 filed on Sep. 11, 2009, and which is herein incorporated by reference.

STATEMENT REGARDING FEDERALLY SPONSORED RESEARCH

Not Applicable.

BACKGROUND OF THE INVENTION

The present application is related generally to large-bearing cage configurations, and in particular, to a large-bearing cage assembly, consisting of a plurality of discrete snap-on bridge elements coupled between axially spaced cage rings which are adjacent opposite axial ends of the rolling elements.

The typical approach to large-bearing cage design has been to extend the design styles for smaller conventional bearings into the large bearing sizes. The first and most common attempt at meeting the needs of larger bearings uses pin style cages to facilitate placement and retention of the rolling elements. While pin style cages provide excellent retention, they are heavy, complex, costly to assemble, and cannot be disassembled without damaging either the cage rings or the cage pins.

Another approach is to modify a stamped-steel style cage for use in the large bearing size range. The first problem here is that for large bearing configurations, the cage designs become too large to be stamped or closed in, so alternate manufacturing processes, such as spun blanks that are water jet cut have been attempted. These alternative manufacturing processes seem to create more problems than they solve. The stamping problems for large size cages are eliminated, but at great cost. Cage costs are effectively increased, not lowered, by the use of alternative manufacturing processes. The step of closing-in is replaced by the steps of cutting the cage, adjusting the circumferential size to get appropriate clearance and welding the cage back together, a complex and costly process. Cage distortion, particularly in pocket length and location, as well as cage roundness and flatness, resulting from this manufacturing process can lead to bearing performance and roller retention issues if not controlled sufficiently. These types of cages are still relatively heavy, and are not easily serviceable. Typically, the resulting cage must be cut and re-welded when serviced.

Both the pin style and formed cages require welding in close proximity to precision bearing components. There is therefore always a risk of bearing damage due to heat and welding spatter and debris.

Multi-pocket polymer cage segments have been used to satisfy the cost and weight needs, but only as rolling element separators with no retention capability. These are not easily serviceable due to the lack of rolling element retention. These designs are for the most part applicable only to unitized bearing assemblies due to the lack of a retaining feature.

Accordingly, it would be advantageous to provide a light weight, low cost, and easily serviceable large bearing cage assembly which provides both rolling element separation and rolling element retention to a large size bearing assembly.

BRIEF SUMMARY OF THE INVENTION

Briefly stated, the present disclosure provides a light weight bearing cage assembly consisting of a plurality of snap-on bridge elements coupled between first and second cage rings. The snap-on bridge elements maintain rolling cage element separation, provide rolling element retention within the bearing assembly, and function as a lubrication reservoir between the rolling elements for grease lubricated bearings. Each snap-on bridge element may be individually removed and replaced by snap-on engagement with the first and second cage rings at opposite axial ends. Optional locking clips or retaining rings fitted over each snap-on end of the bridge elements provides additional security against accidental uncoupling of the bridge elements from the first and second cage rings.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification:

FIG. 12 is a perspective view of one end of the snap on cage bridge of FIG. 12;

FIGS. 13A-13C illustrate side, top, and end views of an alternate clip for securing a snap on cage bridge of the present invention to a ring;

FIGS. 14A-14D illustrate perspective, end, side, and top plan views of a retainer for engaging the clip of FIG. 13A-13C;

FIG. 15A illustrates a side plan view of an alternate configuration for the retainer of FIG. 14C, including a centrally disposed boss adapted to engage a surface of a ring;

FIG. 15B illustrates a sectional view of the retainer of FIG. 15A engaged with the clip of FIG. 13B;

FIG. 19 is a perspective view of an alternate reduced weight embodiment for the snap on cage bridge incorporating a plurality of contact pads on the main bridge section.

Corresponding reference numerals indicate corresponding parts throughout the several figures of the drawings. It is to be understood that the drawings are for illustrating the concepts set forth in the present disclosure and are not to scale.

Figure 1:
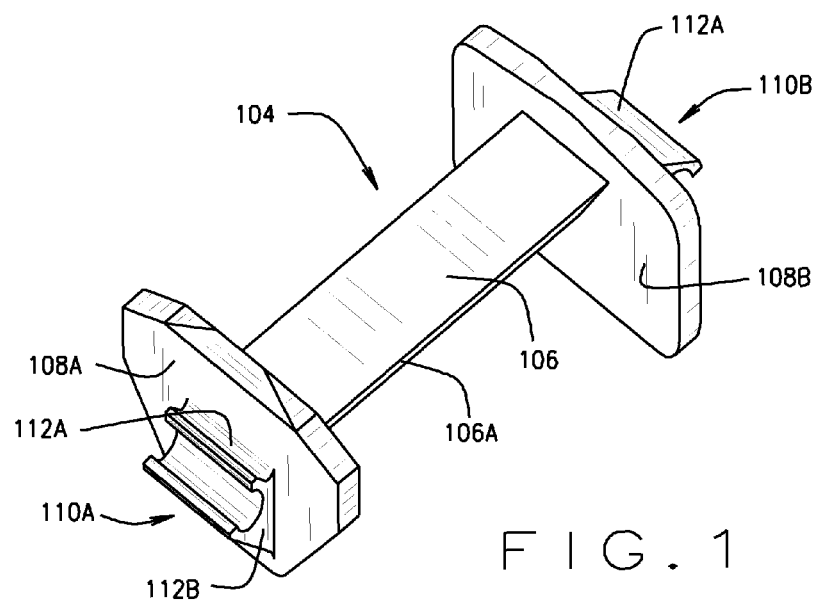
FIG. 1 is a perspective top view of the polymer snap-on cage bridge of the present disclosure.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

Figure 2:
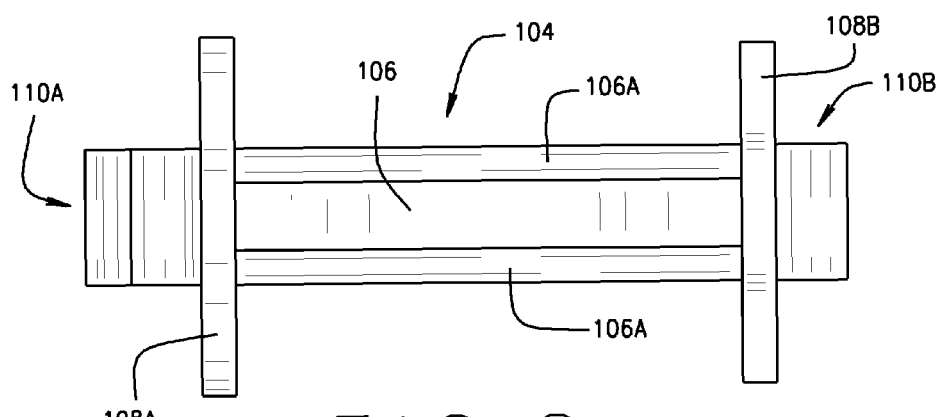
FIG. 2 is an underside (radially inside) plan view of a polymer snap-on cage bridge of FIG. 1.
Figure 3:
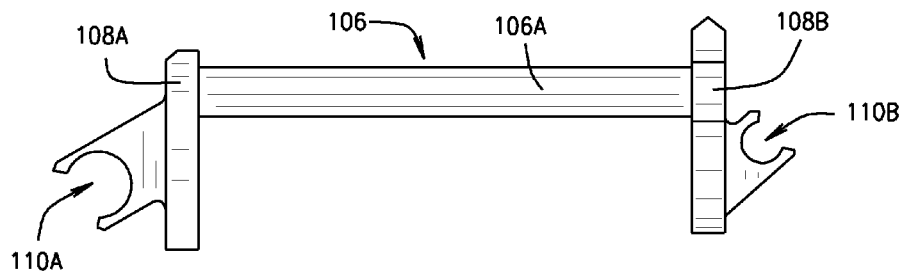
FIG. 3 is a side plan view of the polymer snap-on cage bridge of FIG. 1.
Figure 4:
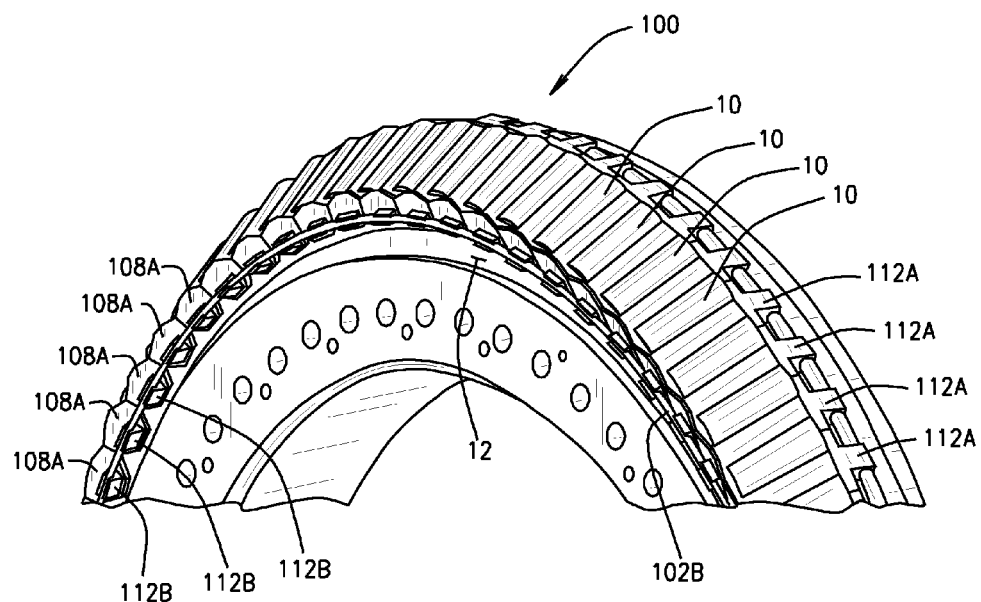
FIG. 4 is a partial perspective view of a bearing assembly employing a plurality of snap-on cage bridges of FIG. 1.

Turning to the figures, and in particular, to FIGS. 1-5, it will be seen that the present disclosure sets forth a modular cage structure 100 for large size rolling element bearings, such as may be found in wind energy applications, and which consist generally of at least one row of rolling elements 10 to be disposed between inner race element 12 and an outer race element (not shown). The cage structure 100 which both separates and retains the rolling elements 10 in a spaced configuration about the inner race element 12 consists generally of a first support ring 102A and a second support ring 102B, each adjacent an associated axial end of the rolling elements 10, and which are coupled together by a plurality of individual bridge elements 104 as best seen in FIG. 4. As shown in FIGS. 1-3, each bridge element 104 consists of at least one main bridge section 106 which contacts and separates a pair of adjacent rolling element bodies 10, such as cylindrical, tapered, or spherical rollers, either above or below the rolling axis or center of the rolling elements 10. When the main bridge 106 section id disposed above the rolling axis or center of the rolling elements 10, the bridge elements 104 will function to maintain the rolling elements 10 against the inner race 12, while in contrast, when the main bridge section 106 is disposed below the rolling axis or center of the rolling elements 10, the bridge elements would conversely function to maintain the rolling elements against the outer race (not shown).

Figure 16:
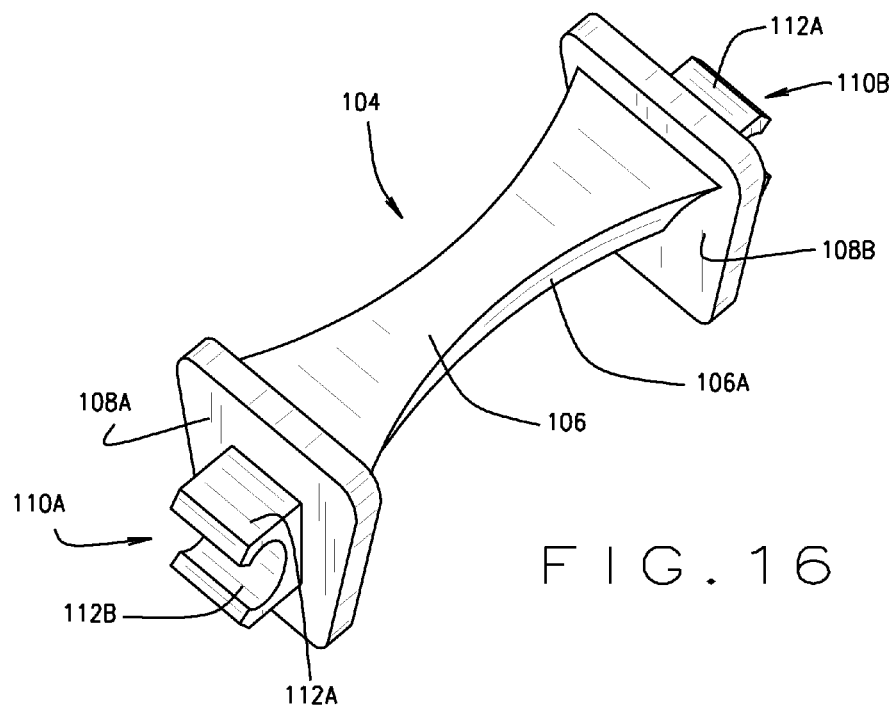
FIG. 16 illustrates a perspective view of a snap on cage bridge embodiment adapted for use with spherical rolling elements.
Figure 17:
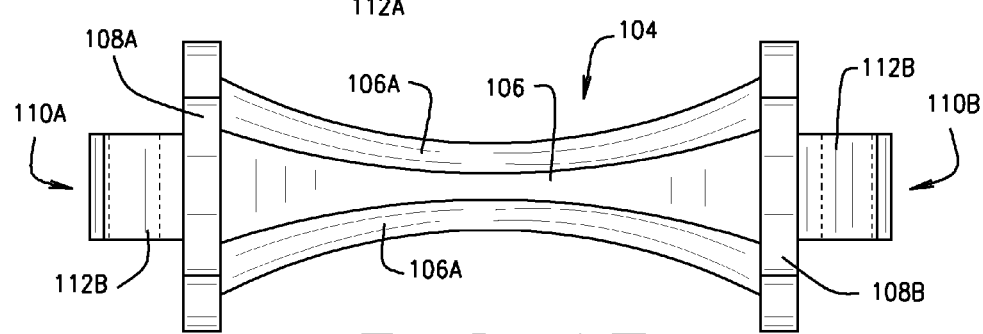
FIG. 17 illustrates a bottom plan view of the snap on cage bridge of FIG. 16.
Figure 18:
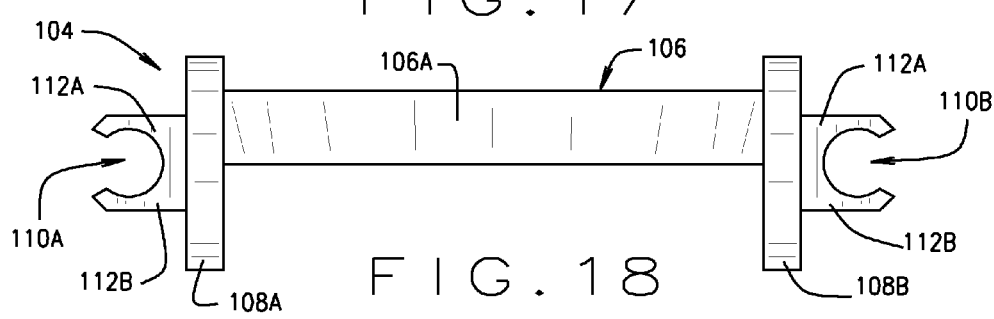
FIG. 18 illustrates a side plan view of the snap on cage bridge of FIG. 16.

The main bridge sections 106 are linear, as shown best in FIGS. 1-3, while the surfaces 106A of the bridges sections 106 which are adjacent to, and are in contact with, the rolling elements 10, may be linear or curved as required to substantially conform to the contour of the adjacent rolling elements 10. For example, as seen in FIGS. 16-18, the surfaces 106A may be suitably curved for use with spherical bearing rolling elements.

The bridge elements 104 coupling between each support ring 102A and 102B terminate in flanges 108A and 108B at each end, configured with associated snap fittings or clips 110A and 110B to utilize a simple snap-on feature to loosely connect to the rings 102A and 102B together to form the bearing cage structure 100. The bridge elements 104 are each preferably formed as unitary members from a rigid polymer material to save both weight and cost. The specific shape and configuration of the flanges 108A, 108B and snaps or clips 110A, 110B may be varied as required to ensure proper spacing between adjacent bridge elements 104 in the cage assembly 100 and engagement with the support rings 102A and 102B.

Figure 10A:
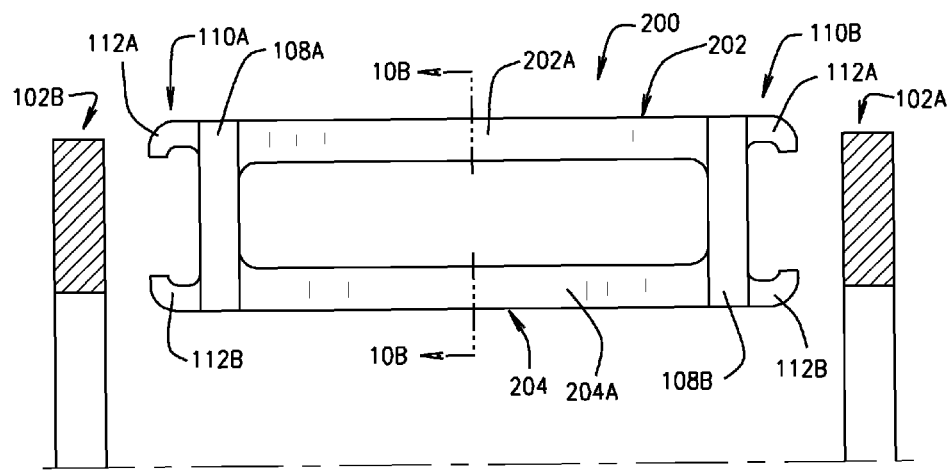
FIG. 10A illustrates a side view of a snap on cage bridge embodiment adapted for use with cylindrical rolling elements.
Figure 10B:
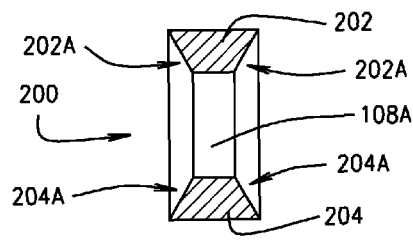
FIG. 10B is a sectional view of the snap on cage bridge of FIG. 10A, taken at line A-A.
Figure 11:
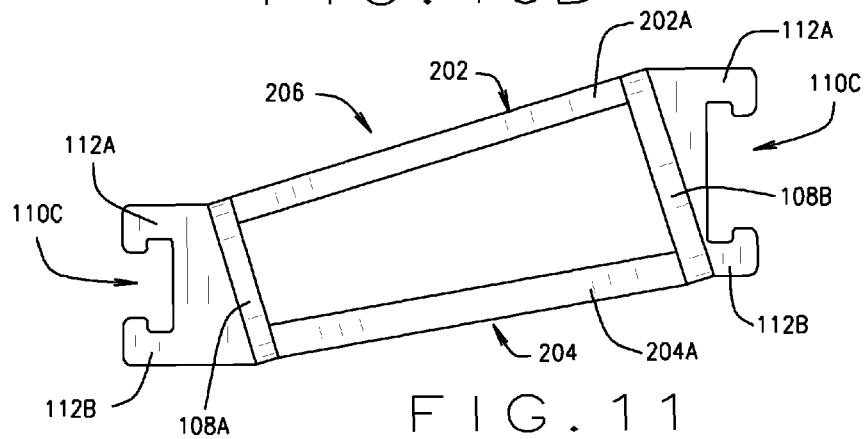
FIG. 11 illustrates a side view of the snap on cage bridge embodiment of FIG. 12, adapted for use with tapered rolling elements.

For some configurations of the bridge elements 104, such as shown at 200 in FIGS. 10A, 11, and 12 the main bridge section 106 is replaced with an upper main bridge section 202 having conforming surfaces 202A, and a lower main bridge section 204 having conforming surfaces 204A, which are aligned above and below the rolling axis of the adjacent rolling elements 10. The upper and lower main bridge sections 202, 204 may be parallel for use with cylindrical or spherical rolling elements, such as shown in FIG. 10A or may be converging/diverging for use with tapered rolling elements, such as shown in FIG. 11.

At each end of the main bridge sections are the flange sections 108 that contact and align with the end surfaces of the adjacent rolling elements 10. Extending outward from each flange section are the snaps or clips 110A, 110B which snap-on to, or engage with, correspondingly sized support rings 102A and 102B. The snaps or clips 110A and 110B are preferably formed by upper tabs 112A and lower tabs 112B with can deflect to fit about and engage the associated support rings 102A, 102B. The snap-on feature allows for easy assembly and disassembly with no damage to any of the surrounding components. As best seen in FIGS. 1, 5A, 11, and 16, the snaps or clips 110A and 110B on each opposite end of the bridge elements 104 are preferably oriented to facilitate snap-on engagement first with one support ring 102A or 102B, and then into engagement with the second support ring 102B or 102A. Removal of the bridge element 104 is merely the reverse procedure. One method for assembly of a bearing using a snap-on cage assembly 100 described herein requires initial placement of the rolling elements 10 about a selected inner or outer race, positioning of the associated bridge elements 104 between each adjacent rolling element, and then clipping a first support ring 102A or 102B into engagement with the snaps or clips 110A and 100B at one end of each bridge element 104, followed by clipping a second support ring 102B or 102A into engagement with the clips 110B or 110A at the opposite end of each bridge element 104.

Figure 5A:
FIGS. 5A-5C illustrate side, end, and bottom plan views of an alternate embodiment snap-on cage bridge adapted for engagement with angled inner and outer rings.
Figure 5B:
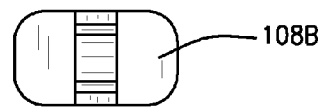
Figure 5C:
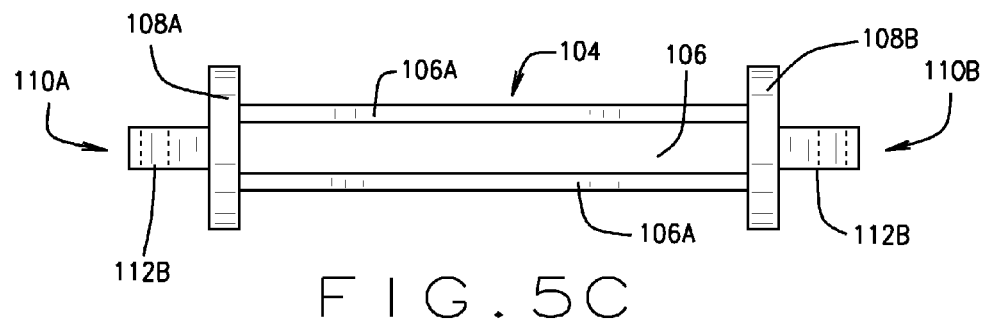
Figure 6:
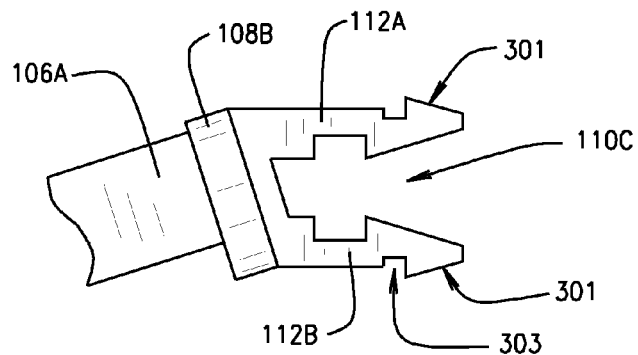
FIG. 6 is an enlarged view of one end of an alternate embodiment snap-on cage bridge adapted for engagement with a vertical ring.

As shown in FIGS. 5A-6, 10A, and 11-13, the snaps or clips 110A and 110B may be provided in a variety of configurations which are understood to be within the scope of the present disclosure. For example, as seen in FIG. 5A, the clips 110 at each end of the bridge element 104 may be aligned for engagement with support rings 102A, 102B which are aligned at an angle perpendicular with the bridge element main bridge section 106 or, as seen at 110C in FIG. 6, one or both of the snaps or clips may be aligned for engagement with a support ring aligned at an angle relative to the bridge element main bridge section 106. The snaps or clips 110A and 110B, as well as the flanges 108A and 108B on which they are disposed, need not be identically configured with each other.

For example, as seen in FIGS. 1 and 3, one of the snaps or clips 110A may be larger than the other snap or clip 110B, as required for the particular bearing assembly configuration in which the bridge element 104 is to be utilized. When utilized with tapered rolling elements, the flanges 108A and 108B will be readily understood to be of different sizes, due to the axial change in diameter of the rolling elements, such as seen in FIG. 11.

Once installed between a pair of support rings 102A and 102B, each bridge element 104 is positioned to guide two adjacent rolling elements 10 by providing a minimum of three surfaces (106A, 108A, and 108B) in contact with each rolling element. The main bridge section 106 may be either a single (solid) wing configuration as seen in FIGS. 1 and 16, or a light-weight double wing design as seen in FIG. 19. For a double wing design 400, the main bridge section 106 is comprised of two intersecting panels 402 extending between the flanges 108A and 108B, which are inclined at an angle to each other, thereby providing a minimum of two points of contact. Additionally either single or double wing designs of the main bridge section 106 may have a number of raised contact pads 404 limiting contact between the main bridge section 106 and adjacent rolling elements 10 to the specific locations of the contact pads 404 along the bridge surface 106A. These three surfaces may contact the circumferential outer surface or body of the rolling element 10, and for cylindrical or tapered rolling elements, each axial end surface. Each rolling element 10 is guided along its body by the main bridge section 106, and on each end by the flanges 108A and 108B. Because the bridge elements 104 are not attached directly to each other, they do not form a pocket to retain the rolling elements 10. Instead, rolling elements 10 are retained between pairs of adjacent bridge elements 104 by the overlapping width of the main bridge section 106 and by the end-flanges 108A and 108B, preventing an excess accumulation of clearance between any one bridge element 104 and the rolling element 10.

Figure 7:
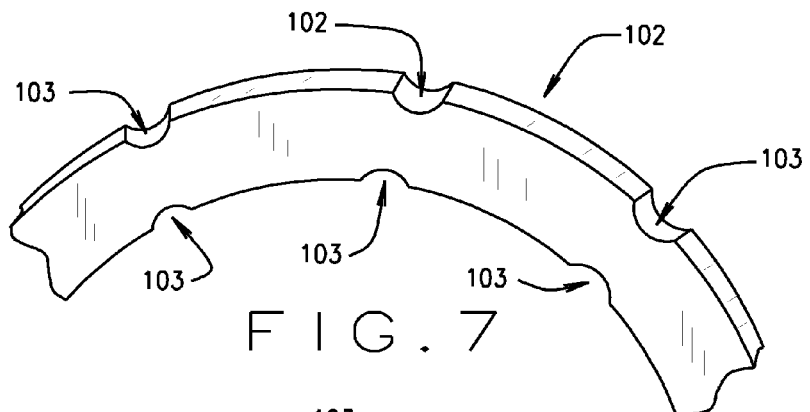
FIGS. 7 and 8 illustrate partial views of rings for engagement with the snap-on cage bridges of the present disclosure, and which are modified with detents to prevent sliding of the cage bridges.
Figure 8:
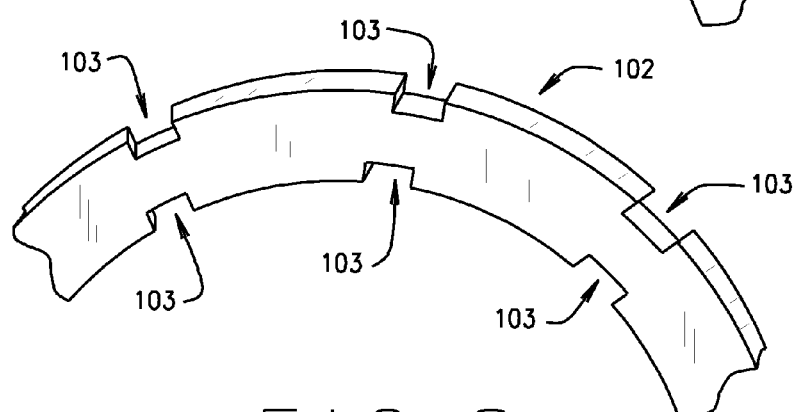

It will be noted that the bridge elements 104 are loosely attached to the support rings 102A, 102B by the snap-on engagement with the snaps or clips 110A and 110B, and are generally free to move along the support rings. This makes the bearing cage structure 100 very compliant and capable of absorbing impacts from the rolling elements 10 without creating high tensile stresses in the individual bridge elements 104, permitting the use of lower strength materials such as polymers with smaller cross sections. The use of smaller cross-sections permits the use of more rolling elements 10, and increases the bearing capacity. The loose attachment of the bridge elements 104 to the support rings 102 further prevents the assembled bearing cage structure 100 from skewing the rolling elements relative to the bearing axis of rotation. Optionally, to prevent excessive movement of the bridge elements 104 relative to the support rings 102, fixing detents 103 may be provided in the support rings 102 at the attachment points for each bridge element 104, such as shown in FIGS. 7 and 8. By securing the snaps or clips 110A and 110B to the fixing detents 103, movement of the bridge elements 104 along the circumference of the support rings 102 is prevented.

In addition to providing retention and spacing for the rolling elements 10, the bridge elements 104 are configured to maintain a lubrication reservoir between the adjacent rolling elements 10. The flanges 108 at each end of the bridge elements 104 of the present disclosure function to contain lubricant between the rolling elements 10 by preventing an axial discharge of lubricant from the vicinity of the rolling elements 10. Correspondingly, the close spacing between the rolling element support surfaces 106A on the main bridge structure 106 and the rolling elements 10 functions to maintain a quantity of lubricant in proximity to the rolling element surfaces.

Figure 9:
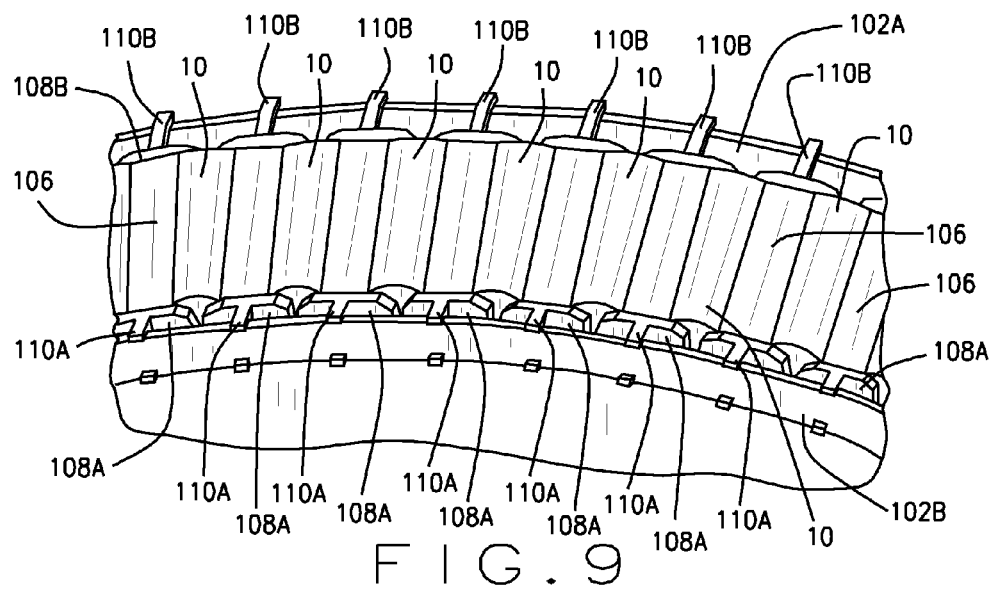
FIG. 9 is a partial view of a bearing assembly employing a plurality of snap-on cage bridges of FIG. 5A.

In general, the purpose of the support rings 102A and 102B is to retain the bridge elements 104 and the rolling elements 10 in place during handling. One support ring 102A or 102B is provided adjacent each axial end of the rolling elements 10, as best seen in FIGS. 4 and 9. Since the support rings 102 are not intended to be load carrying members in operation, they can be relatively thin and light weight. The support rings 102A and 102B can be made of a solid material such as steel wire, wire rope, or from a composite material, as they are acting primarily as tension members when retaining the rolling elements 10. Alternatively, the support rings 102A and 102B can be made of a solid material such as a steel, a composite, or polymer material. The cross section of the support rings 102 is not required to be of any particular shape, and may be round as seen in FIG. 4, rectangular, as shown in FIGS. 7-9, or any convenient shape that can be formed into a ring and engaged by the clip or snap features 110A and 110B of the bridge elements 104. The support rings 102A and 102B can be formed as unitary solid rings or can assembled from a length of material shaped into a ring and joined at the ends. These assembled support rings 102A and 102B can be joined by any convenient method such as welding, threaded, crimped or swaged connectors.

An additional feature for extra retention of the bridge elements 104 to the support rings 102A and 102B is the use of a locking ring or clip 300 to engage the tabs 112A and 112B of the clips or snaps 110A and 110B after the bridge element 104 is coupled to the support rings 102A and 102B, as best seen in FIGS. 6 and 14A-16B. The locking ring or clip 300 may be formed from metal or polymer, and resists spreading of the bridge element clips 112A and 112B after engagement with an associated support ring 102A or 102B, as well as enclosing the open end of the snap or clip 110A or 110B after engagement with the associated support ring 102A or 102B. The locking ring or clip 300 may either lock over raised bosses 301 on the tabs 112A and 112B of the snap or clip 110A or 110B (FIGS. 7, 15A-16B), engage depressions 303 on the tabs 112A and 112B of the snap or clip 110A or 110B, or over a raised section into a depression 303. The locking clip 300, 302 need not be under any preload when snapped in place, and may optionally be curved, flexible, or pre-stressed to facilitate installation and provide additional holding force when subjected to a load.

Those of ordinary skill in the art will recognize that the specific dimensions of the bridge elements 104 are selected to accommodate the size and number of rolling elements 10 disposed within the bearing assembly 100. In particular, the flange elements 108 on each end of the main bridge sections 106 must have a width or transverse dimension such that when a bearing assembly cage structure 100 is fully assembled with a bridge element 104 between each pair of rolling elements 10, the lateral edges of the flanges 108 for each bridge element 104 will nominally have a clearance, but under some conditions may be in abutment with each other, as best seen in FIGS. 4 and 9. This abutment may be either along an edge face, or, by providing angled edges, at a specific contact points between adjacent flanges 108.

It will further be recognized that not every bridge element 104 in the bearing assembly is required to be secured by snapping or clipping to the first and second support rings 102A, 102B. Accordingly, some bridge elements 104 may be "loosely" supported between adjacent rolling elements 10 without engagement to the first and second support rings 102A, 102B.

In summary, a large-size bearing assembly may attain several advantages by incorporating a cage structure 100 utilizing the general concept of support rings 102 coupled by individual snap-on bridge elements 104 of the present disclosure to facilitate spacing and retention of rolling elements 10. These advantages may include:

Lower cost: The present disclosure invention employs simple polymer bridges 104 loosely attached to the support rings 102. The cost of these components may be substantially less than the cost for pin style or formed steel cages.

Light weight: The polymer snap-on bridges 104 and thin support rings 102 of the present disclosure reduce the total weight of the bearing cage assembly 100 for large size bearing assemblies as compared to pin style or formed steel cages. In addition, as seen in FIG. 19, the bridge elements 104 may be constructed with internal voids by removing material from non load-bearing regions, further reducing the overall weight.

Easily serviceable: The snap-on feature of the bridge elements 104 facilitates assembly or disassembly, and does not require any components to be damaged or completely replaced when servicing. Individual bridge elements 104 can be replaced, repaired, or exchanged without requiring complete disassembly of the large size bearing assembly or cage structure 100.

Roller Retention: The attachment of the polymer bridge elements 104 to steel support rings 102 will retain the rolling elements 10 of the bearing on the bearing ring for shipping and handling as well as in service.

Lubrication reservoir: The volume bounded by the snap-on bridge elements 104, the support rings 102 and the rolling elements 10 provides a grease reservoir for grease lubricated bearings. Grease will collect and adhere to the snap-on bridge element 104 surfaces 106A, keeping the lubricant between the rolling elements 10.

Strength/Life: The present disclosure, by loosely attaching light weight bridge elements 104 to supporting rings 102, creates a very compliant bearing cage structure 100 with low impact forces that do not highly stress the individual bridge elements 104. Since the individual bridge elements 104 are not required to be as strong, their size may be reduced to allow for more rolling elements 10 in the large size bearing. Thus in addition to the potential lower cost and weight savings, there is a potential for bearing performance improvement.

As various changes could be made in the above constructions without departing from the scope of the disclosure, it is intended that all matter contained in the above description or shown in the accompanying drawings shall be interpreted as illustrative and not in a limiting sense.

The invention claimed is:

1. A bearing cage (100) for use with a bearing assembly having a plurality of rolling elements (10) disposed about a circumference of a race member, comprising:
   a first support ring (102A) disposed adjacent an axially first end of the rolling elements (10) and bearing assembly;
   a second support ring (102B) disposed adjacent an axially second end of the rolling elements (10) and bearing assembly; and
   a bridge element disposed between each pair of adjacent rolling elements (10), each bridge element (104) having respective flange portions (108A, 108B) that selectively abut flange portions of an adjacent bridge element to maintain a spacing between adjacent rolling elements (10), the bridge elements retaining said rolling elements relative to said race member, at least one of said bridge elements being provided with snap fittings for attaching said bridge element to said support rings by a snap-on engagement, which allows free movement of the bridge element along the support rings while the bridge element is engaged with the support rings.

2. The bearing cage (100) of claim 1 wherein each of said bridge elements (104) is configured with a conforming surface (106A) to entrap a lubricant adjacent to a surface of each of said adjacent rolling elements (10).

3. The bearing cage (100) of claim 1 wherein each of said first and second support rings (102) are configured as tension members.

4. The bearing cage (100) of claim 1 wherein said rolling elements are selected from a set of rolling elements including cylindrical rollers, tapered rollers, and spherical rollers.

5. The bearing cage (100) of claim 1 wherein each bridge element (104) includes a plurality of contact pads (404) disposed to contact surfaces of adjacent rolling elements.

6. The bearing cage (100) of claim 1 wherein the respective flange portions (108A, 108B) are at opposite axial ends of the bridge section.

7. The bearing cage (100) of claim 6 wherein a plurality of said bridge elements are provided with snap fittings for attaching said bridge elements to said support rings by a snap-on engagement, which allows free movement of the bridge elements along the support rings while the bridge elements are engaged with the support rings, with each of said bridge elements (104) with snap fittings being coupled to each of said first and second support rings (102A, 102B) with a double-sided snap fitting (110A, 110B), and wherein each of said double-sided snap fittings (110A, 110B) are disposed on and extend away from an outer surface of each of said flange portions (108A, 108B).

8. The bearing cage (100) of claim 7 further including a locking ring or clip (300) fitted to each snap fitting (110A, 110B), each of said locking rings or clips configured to secure an associated snap fitting in engagement with a support ring (102A, 102B).

9. The bearing cage (100) of claim 6 wherein said bridge elements (104) are further configured such that said bridge section (106) is substantially parallel to an outer surface of each of said adjacent rolling elements (10), and wherein each of said flange portions (108A, 108B) are substantially perpendicular to the bridge section (106).

10. The bearing cage (100) of claim 6 wherein the bridge section (106) of each of said bridge elements (104) is defined by first and second bridge sections (202, 204) coupling said flange portions (108A, 108B), said first and second bridge sections spaced radially from each other about the bearing axis of rotation, each substantially parallel to an outer surface of each of said adjacent rolling elements (10); and
   wherein said first bridge section is displaced radially inward towards said bearing axis of rotation in relation to a rolling axis of said rolling element, and wherein said second bridge section is displaced radially outwards from said bearing axis of rotation in relation to said rolling axis of said rolling element.

11. The bearing cage (100) of claim 6 wherein said bridge section (106) of each of said bridge elements (104) is disposed either radially inward towards or radially outwards from said bearing axis of rotation relative to a rolling axis of said adjacent rolling elements (10).

12. The bearing cage (100) of claim 6 wherein said bridge element (104) includes at least two panels (402) disposed between the flange portions (108A, 108B), said panels being aligned at an incline relative to each other.

13. The bearing cage of claim 1, wherein the snap fittings are double-sided snap fittings (110A, 110B) disposed on and extending away from an outer surface of each of said flange portions (108A, 108B).

14. A bearing cage (100) for use with a bearing assembly having a plurality of rolling elements (10) disposed about a circumference of a race member, comprising:

a first support ring (102A) disposed adjacent an axially first end of the rolling elements (10) and bearing assembly;

a second support ring (102B) disposed adjacent an axially second end of the rolling elements (10) and bearing assembly;

a bridge element disposed between each pair of adjacent rolling elements (10), each bridge element (104) configured to maintain a spacing between each said pair of adjacent rolling elements (10) and to retain said rolling elements relative to said race member, at least one of said bridge elements being provided with snap fittings for attaching said bridge element to said support rings by a snap-on engagement which allows free movement of the bridge element along the support rings, each of said bridge elements (104) including at least one bridge section (106), and a flange portion (108) at each axial end of the bridge section, each of said bridge elements (104) with snap fittings being coupled to each of said first and second support rings (102A, 102B) with a double-sided snap fitting (110A, 110B), and wherein each of said double-sided snap fittings (110A, 110B) are disposed on an outer surface of each of said flange portions (108); and, a locking ring or clip (300) fitted to each snap fitting (110A, 110B), each of said locking rings or clips configured to secure an associated snap fitting in engagement with a support ring (102A, 102B).

\* \* \* \* \*